(12) United States Patent
Tanaka

(10) Patent No.: US 10,796,597 B1
(45) Date of Patent: Oct. 6, 2020

(54) DIGITAL DEVICE DETOX BAND

(71) Applicant: Bliss Tanaka, Honolulu, HI (US)

(72) Inventor: Bliss Tanaka, Honolulu, HI (US)

( * ) Notice: Subject to any disclaimer, the term of this patent is extended or adjusted under 35 U.S.C. 154(b) by 0 days.

(21) Appl. No.: 16/431,624

(22) Filed: Jun. 4, 2019

(51) Int. Cl.
  *G06F 1/16* (2006.01)
  *G09B 19/00* (2006.01)
  *H04M 1/667* (2006.01)

(52) U.S. Cl.
  CPC ........... *G09B 19/00* (2013.01); *G06F 1/1626* (2013.01); *G06F 1/1632* (2013.01); *H04M 1/667* (2013.01)

(58) Field of Classification Search
  CPC ..... G09B 19/00; G06F 1/1632; G06F 1/1626; H04M 1/667
  See application file for complete search history.

(56) References Cited

U.S. PATENT DOCUMENTS

| 9,968,169 | B1 * | 5/2018 | Pelton | A45C 11/00 |
| 2005/0172886 | A1 * | 8/2005 | Marcus | B42D 9/004 116/238 |
| 2013/0155610 | A1 * | 6/2013 | Schroeder | B23P 11/00 361/679.58 |
| 2016/0277055 | A1 * | 9/2016 | Zechner | G06F 1/1626 |
| 2018/0343329 | A1 * | 11/2018 | Robinson | H04M 1/026 |

* cited by examiner

*Primary Examiner* — Christopher M Brandt
(74) *Attorney, Agent, or Firm* — Kilpatrick Townsend & Stockton LLP

(57) ABSTRACT

Digital device detox bands are disclosed. For one example, a digital device band comprises an elastic part to stretch around a digital device having one or more sensors, and a cover connected to the elastic part to be placed over at least one of the one or more sensors. The cover is positioned to cover the one or more sensors such that the one or more sensors are prevented from activating the digital device when in a sleep mode The one or more sensors include a camera, a touch sensor, or an activation button to activate the digital device. The elastic part stretches horizontally or vertically to snugly fit around the digital device which can be a mobile phone, mobile computing device or pad having varying dimensions.

17 Claims, 6 Drawing Sheets

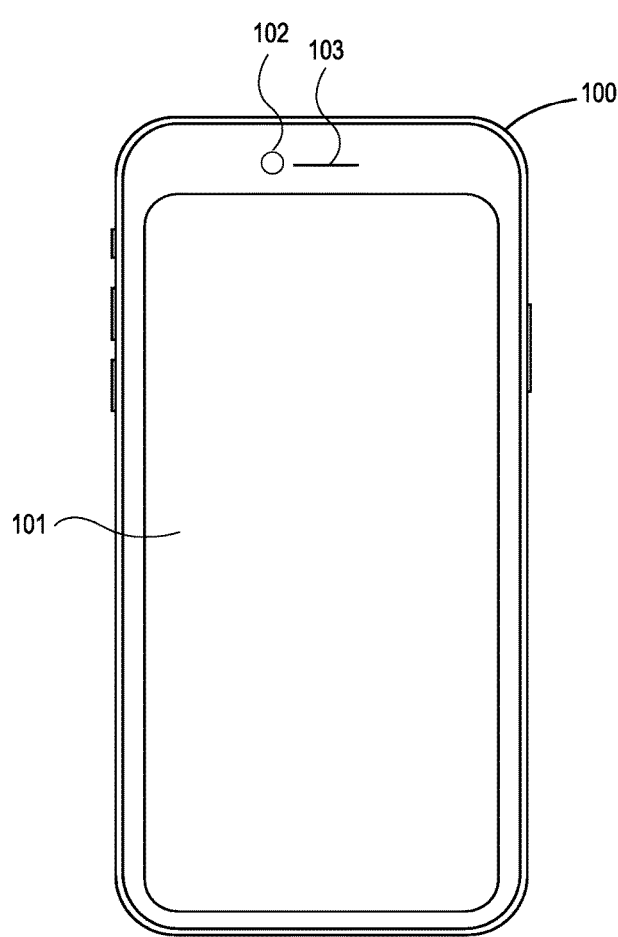
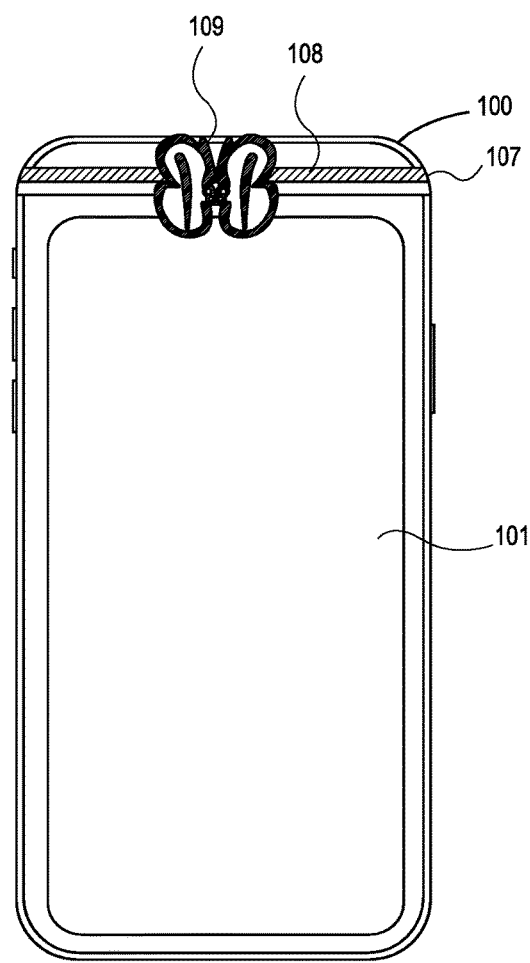
FIG. 1A          FIG. 1B

DIGITAL DEVICE DETOX BAND

FIELD

Embodiments of the invention relate generally to digital devices including mobile phones and computing devices. More particularly, embodiments of the invention relate to a digital device detox band.

BACKGROUND

Digital devices such as mobile phones and computing pads are ubiquitous and used by billions of people every day around the world. Common uses of such digital devices include social media, texting, instant messaging, online shopping, gaming etc., which in certain cases, can become addictive and detrimental to a user over time. For some users, when a digital device is on, a user can become impulsive leading to excessive use of the device. Such overuse of a digital device can have negative affects to a user such as interfering with work, school, and relationships. Although digital devices can be placed in sleep mode (not active), the digital device can be easily activated for use by pressing the home button or placing your face in front of the camera for face activation if configured for face recognition. Preventing ease of activation for use of a digital device can assist with digital device addiction and overuse of the digital device that can benefit the quality of life for users of digital devices.

SUMMARY

Digital device detox bands are disclosed assisting with digital device addiction and overuse. For one example, a digital device band comprises an elastic part to stretch around a digital device having one or more sensors, and a cover that can be on the front of the band and connected to the elastic part. The cover is placed over and covers at least one of the one or more sensors to prevent the digital device from being activated while covering the one or more sensors. The one or more sensors can include a camera, a touch sensor, or an activation button. The elastic part can stretch horizontally or vertically to snugly fit around the digital device. Examples of a digital device can include a mobile phone, mobile computer or computing pad having varying dimensions.

For one example, the digital device detox band can include another cover that is placed over at least one of the sensors not covered by the second part. The covers can have a sufficient size and shape to be placed over the one or more sensors. The elastic part can include an elastic material such as silicone or other elastic and stretchable material such that it can stretch and snuggly fit around the digital device. For one example, a cover that is placed over a sensor can be one piece or unit with the elastic part made of the same elastic material.

For one example, a digital device includes multiple detox bands having an elastic part and at least one cover placed over at least one sensor that prevents activation of the digital device. For one example, a detox band can have two covers to cover at least two sensors. For other examples, the digital device can have at least two detox bands stretching around the digital device, each detox band having a respective cover placed over at least one sensor. The covers for the detox bands can include a motif of any size, shape or design that sufficiently covers one or more sensors. By using digital device detox band, a user can have a means or mechanism to prevent activation of the digital device until the detox band is removed.

Other bands, apparatuses, methods and devices are described.

BRIEF DESCRIPTION OF THE DRAWINGS

The appended drawings illustrate examples and are, therefore, exemplary embodiments and are not considered to be limiting in scope.

FIG. 1A illustrates an exemplary digital device such as a mobile phone with a sensor to activate the phone on a top side.

FIG. 1B illustrates the exemplary digital device of FIG. 1A having a detox band covering the sensor that activates the mobile phone device on the top side.

DETAILED DESCRIPTION

Figure 2A:
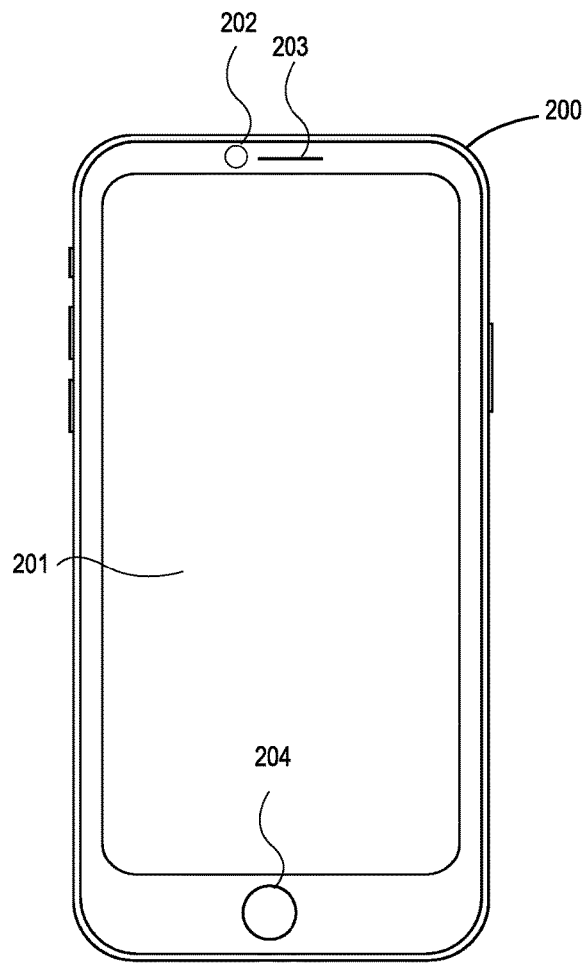
FIG. 2A illustrates an exemplary digital device such as a mobile phone with a sensor to activate the mobile phone on a bottom side.

Digital device detox bands are disclosed assisting with digital device addiction and overuse. A detox band includes an elastic part and a cover to be placed over at least one sensor of a digital device. The cover is positioned to cover a sensor that prevents activation of the digital device. Examples of a digital device can include a mobile phone, mobile computer, or a computing pad of any dimension having one or more sensors used to activate the digital device, e.g., a home button to activate the digital device when in sleep mode. Example sensors can include a camera, a touch sensor, or an activation button used to activate the digital device for use by a user. For one example, the detox band can stretch horizontally or vertically to snugly fit around the digital device such that a cover is placed over at least one sensor that can disallow activation of the digital device.

For one example, the elastic part includes an elastic material such as silicone that can stretch and snuggly fit around the digital device. The cover can be of any shape and size that sufficiently covers an activation sensor. The cover and the elastic part can form a single piece or unit made of the same elastic material. For one example, a detox band can have two covers placed over at least two sensors. For other examples, the digital device can have at least two detox bands stretching around the digital device, each detox band having a respective cover to cover at least one sensor that can prevent the digital device from activation. In this way, the digital device detox band provides a means or mechanism to prevent activation of the digital device until the detox band is removed. This can assist a user in dealing with digital device addiction or from overuse of a digital device with a material intervention that allows more intermittent (analog) mindfulness.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described in order to provide a concise discussion of the embodiments and examples.

FIG. 1A illustrates an exemplary digital device such as a mobile phone 100 with a sensor 102 to activate the mobile phone 100 on a top side. For one example, mobile phone 100 can represent a generic phone for any make and model having a sensor 102 that includes a camera used to recognize a face of a user. In this example, mobile phone 100 is configured to activate and allow a user to use the mobile phone 100 after the face of the user is authenticated using a face recognition application. For one example, mobile phone 100 can operate in sleep mode such that touch display 101 is off and can be activated by recognizing a face using sensor 102. Although a touch to the touch display 101 can cause the display to turn on, the mobile phone 100 is configured to activate and allow use of the mobile phone if a user is recognized as a valid user by way of sensor 102 that can be a camera.

Other sensors of mobile phone 100 include sensor 103 that can represent a microphone or a speaker or additional cameras or touch sensors. Mobile phone 100 can have any size and dimension. For example, the height of mobile phone 100 can be five or more inches and the width can be more than two or more inches. Sensor 102 can be less than a quarter of a centimeter while sensor 102 can be more than a centimeter. Mobile phone 100 can be other types of digital devices including a mobile computer or computing pad having varying dimensions. For example, as a computing pad, it can have a width larger than a width of mobile phone 100 and an activation button to activate it when in a sleep mode.

FIG. 1B illustrates the exemplary digital device such as mobile phone 100 of FIG. 1A having a detox band 107 with an elastic part 108 and a cover 109 that is positioned over sensor 102 including a camera used to activate mobile phone 100 on the top side. The elastic part 108 stretches and snugly fits around mobile phone 100. The cover 109 can be any shape and size having dimensions to sufficiently cover sensor 102 and disallow mobile phone 100 from being activated if in sleep mode. In this way, cover 109 can leave mobile phone 100 in sleep mode until the detox band 107 is removed. In this example, cover 109 can include a motif (e.g., butterfly) and cover other sensors such as sensor 103.

For one example, the elastic part 108 can have a length in the horizontal direction that is less than the width of mobile phone 100, a width in the vertical direction that is less or more than a centimeter, and a thickness can be a millimeter or less than half a centimeter. For one example, the cover 109 can be of any shape, size and thickness that sufficiently covers at least sensor 102 in order to prevent it from being activated while cover 109 is over sensor 102. In other words, cover 109 can prevent sensor 102 as a camera from capturing a face of a user to activate mobile phone 100.

For other examples, besides having a motif, cover 109 can include other shapes and sizes as shown in FIGS. 4A-4D. The cover 109 can be located in a central location of elastic part 108. In this example, cover 109, as a butterfly motif, covers both sensors 102 and 103. For one example, cover 109 and elastic part 108 can be one piece or unit and made of the same elastic material such as silicone having the same thickness. Other elastic materials for cover 109 and elastic part 108 can include silicone rubber, synthetic rubber, polymer or an elastomer. Once elastic part 108 is stretched around mobile phone 100, the detox band 107 should stay fixed to disallow face recognition by sensor 102 and activation of mobile phone 100 until a user physically removes the detox band 107 from mobile phone 100. After the detox band 107 is removed, a user can activate mobile phone 100 since the cover 109 is no longer blocking sensor 102 from capturing an image of a user for face recognition. Although detox band 107 is shown for a mobile phone 100, detox band 107 can be configured and have dimensions that can be used with other digital devices such as a mobile computer or computing pad that covers on one or more sensors used for activating the digital device when in sleep mode.

Figure 2B:
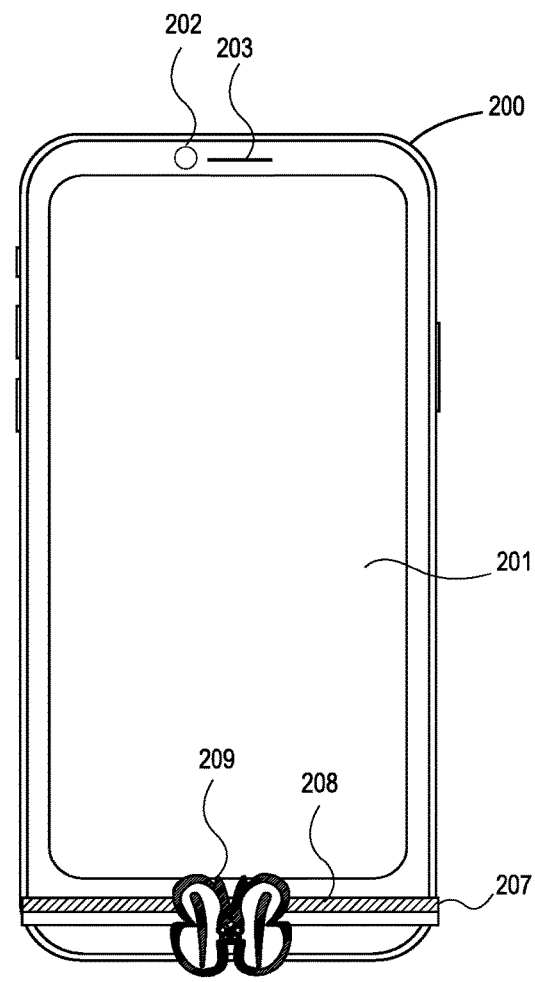
FIG. 2B illustrates the exemplary digital device of FIG. 2A having a detox band covering the sensor that activates the mobile phone device on the bottom side.

FIG. 2A illustrates an exemplary digital device as mobile phone 200 with a sensor 204 as a home button to activate the phone on a bottom side. In this example, mobile phone 200 includes sensors 202 and 203, which can include a camera and a microphone on a top side. When in sleep mode, the touch display 201 is off. A user can press on sensor 204, which is the home button, to activate phone 200. FIG. 2B illustrates the exemplary mobile phone 200 of FIG. 2A having a detox band 207 covering the sensor 204 that activates the mobile phone 200 on the bottom side. Referring to FIG. 2B, detox band 207 can be made in the same manner as detox band 107 having an elastic part 208 and a cover 209 that includes a butterfly motif. The elastic part 208 stretches and snugly fits around mobile phone 200 at the bottom side. The cover 209 is positioned over sensor 204 (home button) used to activate mobile phone 200. Similar to cover 109, cover 209 can leave mobile phone 200 in sleep mode until the detox band 207 is removed. For one example, the cover 209 has a sufficient thickness and size, which can be half a centimeter or less, that does not activate sensor 204 even if pressure is applied to cover 209. In this way, cover 209 of detox band 207 disallows access to sensor 204 for activating mobile phone 200.

Figure 2C:
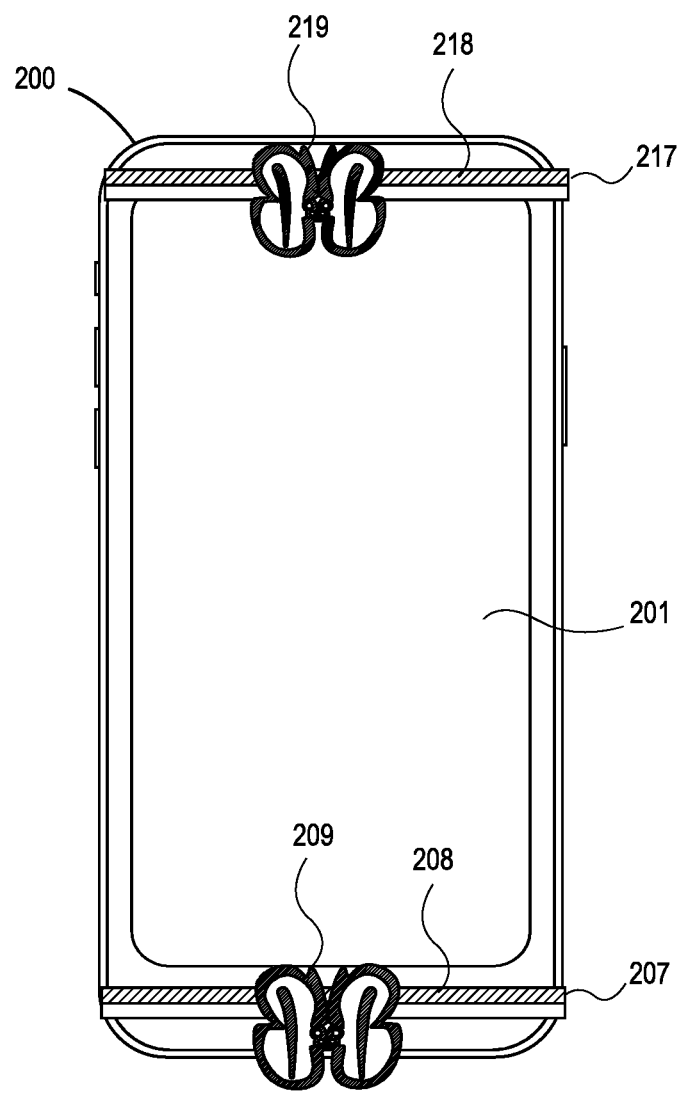
FIG. 2C illustrates the exemplary digital device of FIG. 2A having a first detox band covering a sensor on the top side and a second detox band covering a sensor on the bottom side of the mobile phone.

FIG. 2C illustrates the exemplary mobile device 200 of FIGS. 2A-2B having a first detox band 207 covering a sensor 204 on the bottom side and a second detox band 217 covering sensors 202 and 203 on the top side. In this example, first detox band 207 includes an elastic part 208 and a cover 209 and the second detox band 217 includes an elastic part 218 and a cover 219. Cover 209 includes a butterfly motif and is positioned over sensor 204 to disallow activation of the home button. Cover 219 includes a butterfly motif and is positioned over sensors 202 and 203. Although sensors 202 and 203 may not be configured to activate mobile phone 200 when in sleep mode, cover 219 can provide further protection or provide personal privacy or usage deterrence to the components 202 and 203 or prevent use even if mobile phone 200 is activated and a user is using touch display 201. In the situation where sensors 202 or 203 can be used to activate mobile phone 200, cover 219 can also disallow activation by preventing use of those sensors 202 and 203. Detox bands 207 and 217 can have the same dimensions and be made in the same manner as detox band 107 of FIGS. 1A-1B.

Figure 3A:
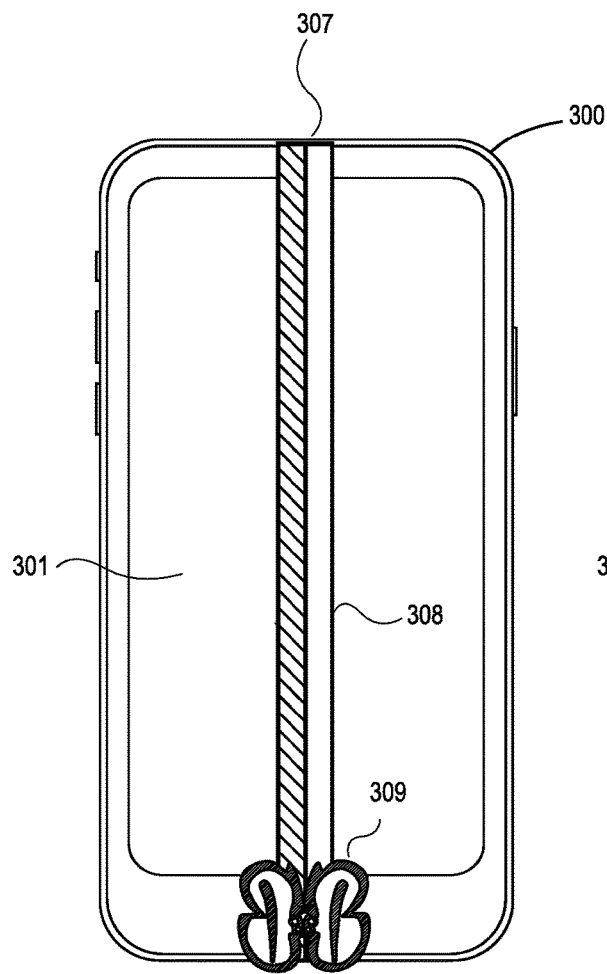
FIG. 3A illustrates an exemplary digital device such as a mobile phone that can have sensors on a top side or a bottom side used for activating the mobile phone and a detox band stretching vertically around the mobile phone with a cover covering a sensor on a bottom side.
Figure 3B:
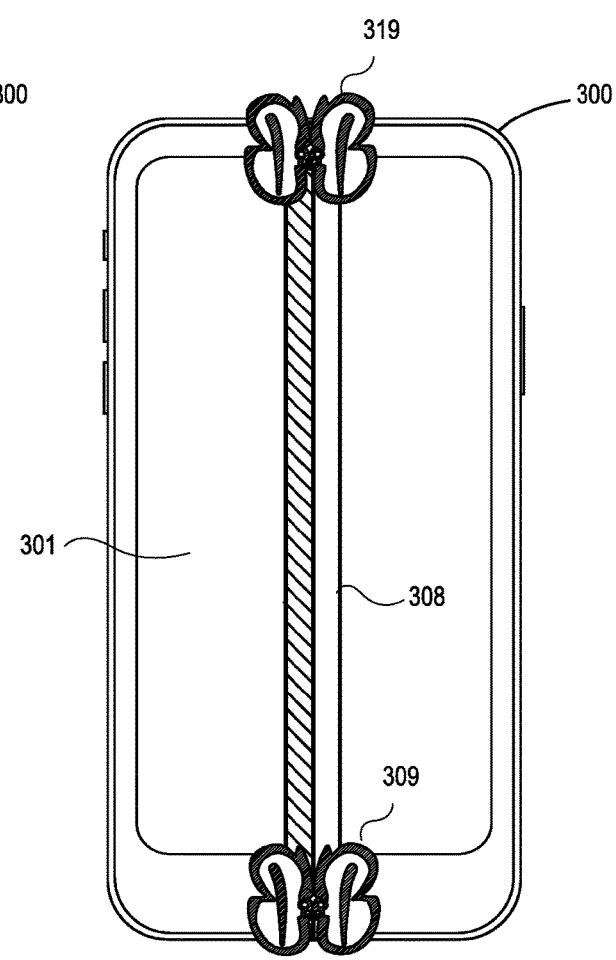
FIG. 3B illustrates the exemplary digital device of FIG. 3A with a detox band stretching vertically around the mobile phone with a first cover covering a sensor on a bottom side and a second over covering a sensor on a top side.

FIG. 3A illustrates an exemplary mobile phone 300 that can have sensors on a top side or a bottom side which are covered by a detox band 307. For one example, mobile 300 can have the same top side and bottom side sensors of mobile phone 200 of FIGS. 2A-2C. In this example, detox band 307 stretches vertically and snuggly fits around mobile phone 300 in the vertical direction. The detox band 307 can have a longer length and use more silicon material than the detox bands 107, 207 and 217. Referring to FIG. 3A, on the top side, detox band 307 includes an elastic part 308 that can cover one or more sensors on a top side when it is stretched around mobile phone 300. For example, the elastic part 308 can have a width that is sufficient in size to cover sensors on the top side of mobile phone 300. On the bottom side, detox band 307 includes a cover 309 that covers a bottom sensor such as a home button and disallow activation mobile phone 300 by preventing use of the home button. FIG. 3B shows the same detox band 307 of FIG. 3A having an additional cover 319 on the top side, which can be used to cover sensors on the top side. In the examples of FIGS. 3A-3B, covers 309 and 319 can be used a means to prevent activation of the digital device 300 and provide privacy protection from usage of the sensors under the covers 309 and 319 of the digital device 300.

Figure 4A:
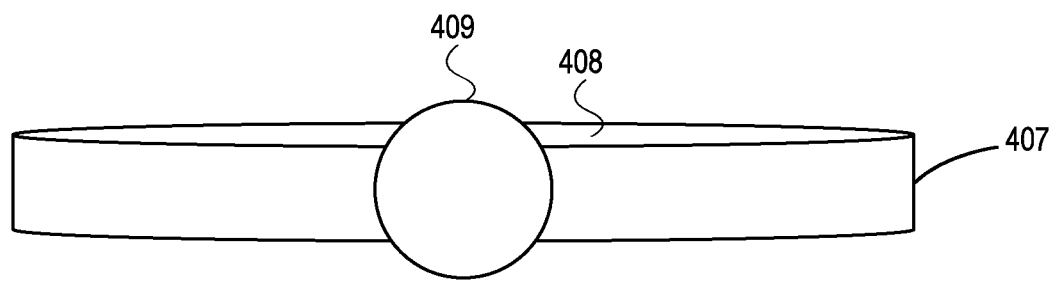
FIGS. 4A-4D illustrate exemplary detox bands with covers having different shapes and sizes.
Figure 4B:
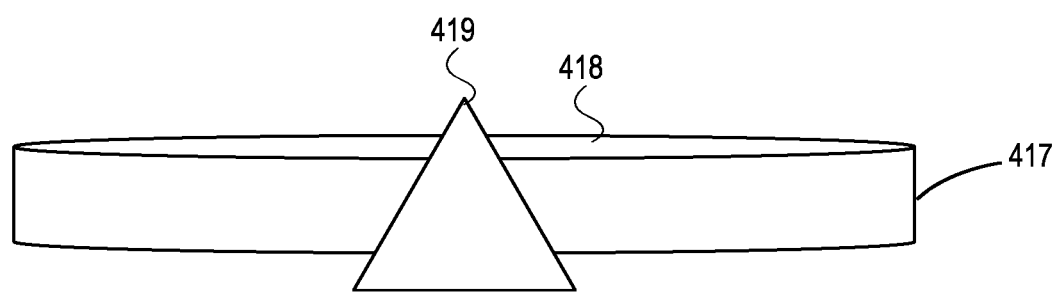
Figure 4C:
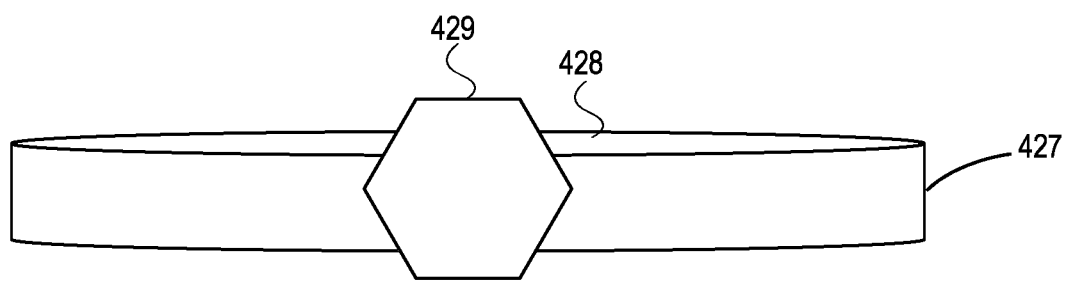
Figure 4D:
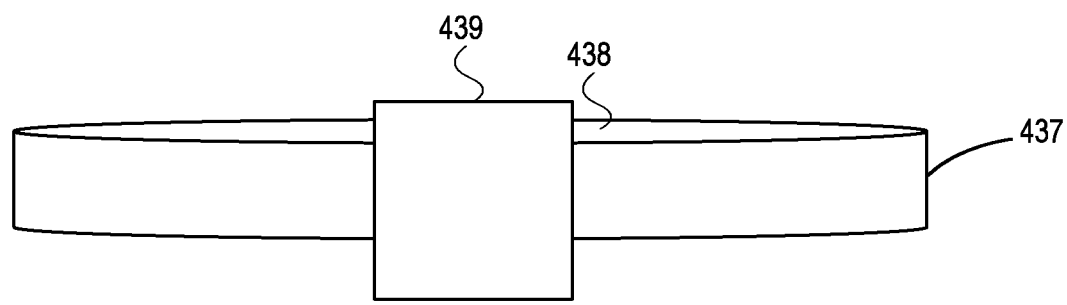

FIGS. 4A-4D includes exemplary detox bands 407 through 437 having varying sizes and shapes for covers. Referring to FIG. 4A, a detox band 407 includes an elastic part 408 having a circular cover 409. Referring to FIG. 4B, a detox band 417 includes an elastic part 418 having a triangular cover 419. Referring to FIG. 4C, a detox band 427 includes an elastic part 428 having a pentagonal cover 429. Referring to FIG. 4D, a detox band 437 includes an elastic part 438 and a square cover 439. In the above examples, elastic parts 408, 418, 428 and 438 can form a single piece or unit with covers 409, 419, 429 and 439 and be made of an elastic material such as silicone, silicone rubber, polymer or an elastomer. For other examples, covers 409, 419, 429 and 439 can be separate pieces of elastic material that are joined with elastic parts 408, 418, 428 and 438 by way of a single hole button such that the covers can be interchangeable and removed.

Figure 5:
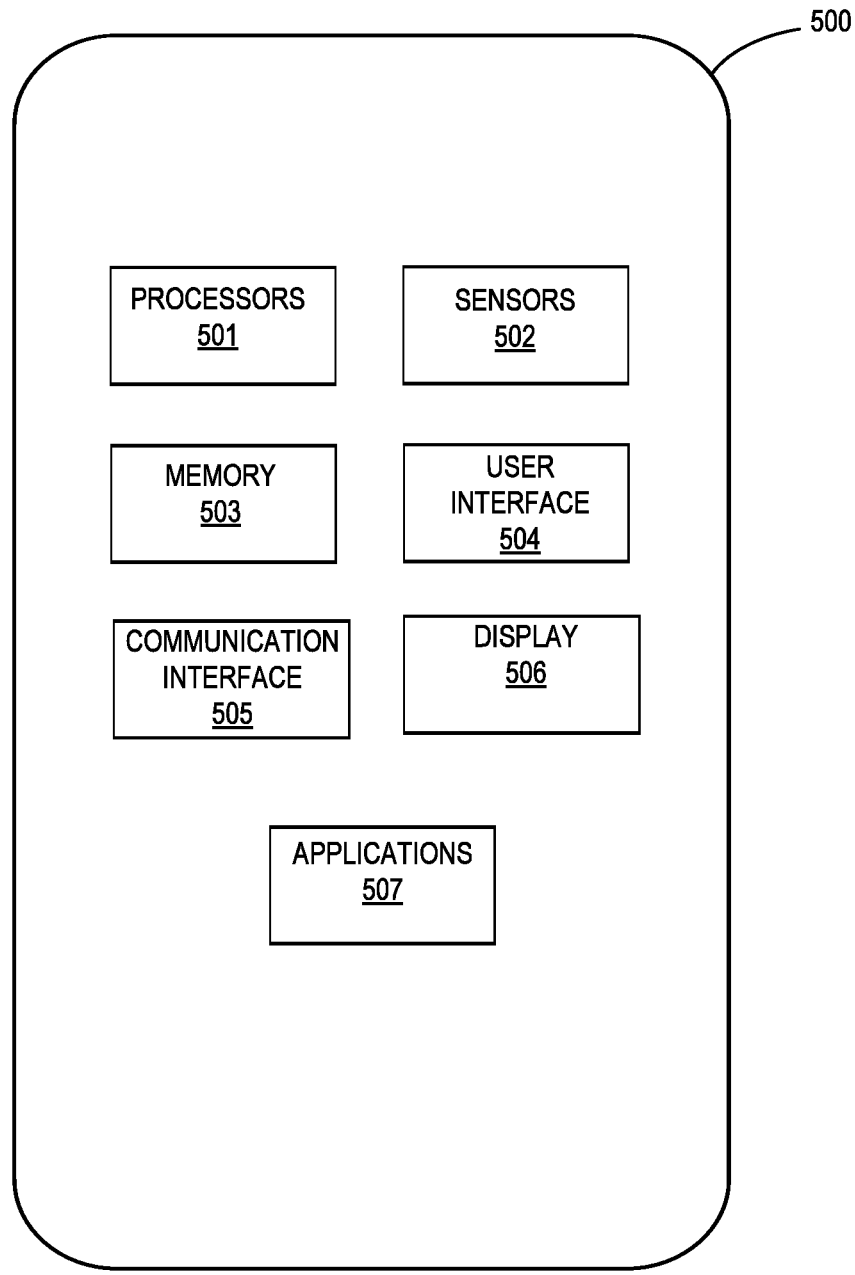
FIG. 5 illustrates an exemplary block diagram of basic components of a digital device.

FIG. 5 illustrates an exemplary block diagram of basic components of a digital device 500. Digital device 500 can be a data processing or computing system such as a mobile phone, mobile computer or computing pad having sensors 502 that can activate the device when in a sleep or power saving mode implemented by one or more applications 507 as described herein. Digital device also includes processors 501, memory 503, user interface 504 and communication interface 505. Processors 501 can include multiple processors to implement communication, interface and applications for digital device 500. Memory 503 can be any type of volatile or non-volatile memory storing data for digital device 500. Display 506 can include touch displays as shown in FIGS. 1A-4D. User interface 504 can process inputs from users from any number of sensors or inputs such as touch screens, touch pads, touch sensitive input devices, keyboards, dedicated keys (e.g. buttons for volume or mute or home, etc.). Communication interface 505 can include any type of communication modules such as modems, network interfaces, Bluetooth radio systems for wireless or wired communications.

In the foregoing specification, the invention has been described with reference to specific exemplary embodiments thereof. It will, however, be evident that various modifications and changes may be made thereto without departing from the broader spirit and scope of disclosed examples and embodiments. The specification and drawings are, accordingly, to be regarded in an illustrative rather than a restrictive sense.

What is claimed is:

1. A digital device activation and overuse prevention apparatus comprising:
   an elongated elastic band sized to snuggly stretch horizontally or vertically around a front, back and sides of only a portion of the digital device near a camera or an activation sensor on the digital device;
   a sensor cover connected to the elongated elastic band and sized to be placed over the camera or activation sensor on the digital device;
   wherein the sensor cover is further sized to block the camera or activation sensor while blocking either none or only a portion of a display of the digital device; and
   wherein the sensor cover prevents the camera or activation sensor from activating the digital device when in a sleep mode.

2. The digital device activation and overuse prevention apparatus of claim 1, wherein the sensor cover is interchangeable and removable.

3. The digital device activation and overuse prevention apparatus of claim 1, wherein the sensor cover is wider than the elongated elastic band; and
   wherein the elongated elastic band is positioned away from a corner of the digital device to maintain a snug fit where the elongated elastic band itself does not cover the entire camera or activation sensor.

4. The digital device activation and overuse prevention apparatus of claim 1, wherein the elongated elastic band has a length that is less than a width of the digital device, is a centimeter or less in width and has a thickness between a millimeter and half a centimeter.

5. The digital device activation and overuse prevention apparatus of claim 1, wherein the digital device is a mobile phone device, mobile computing device or computing pad.

6. The digital device activation and overuse prevention apparatus of claim 1, further comprising:
   an additional sensor cover connected to the elongated elastic band placed over the one of the camera or activation sensor not covered by the sensor cover.

7. The digital device activation and overuse prevention apparatus of claim 1, wherein the elongated elastic band has a width of a centimeter or less.

8. The digital device activation and overuse prevention apparatus of claim 1, wherein the cover includes a motif.

9. The digital device activation and overuse prevention apparatus of claim 1, wherein the elongated elastic band has sufficient width to cover the camera or activation sensor.

10. The digital device activation and overuse prevention apparatus of claim 1, wherein the elongated elastic band comprises silicone, silicone rubber, polymer or elastomer.

11. The digital device activation and overuse prevention apparatus of claim 1, wherein the sensor cover is placed over the camera of the digital device, providing a privacy function in addition to activation prevention.

12. A digital device activation and overuse prevention apparatus comprising:
   an elongated elastic band sized to snuggly stretch horizontally or vertically around a front, back and sides of a portion of the digital device near a camera on the digital device;

a sensor cover that is wider than the elongated elastic band and is connected to the first elongated elastic band and sized to be placed over the camera on the digital device;

wherein the sensor cover is further sized to block the camera when the elongated elastic band is positioned away from a corner of the digital device to maintain a snug fit where the elongated elastic band itself does not cover the entire camera;

wherein the sensor cover over the camera disallows face recognition by the camera to prevent activation of the digital device;

wherein the elongated elastic band has a length that is less than a width of the digital device, is a centimeter or less in width and has a thickness between a millimeter and half a centimeter;

wherein the digital device is a mobile phone device, mobile computing device or computing pad;

wherein the digital device has a display and a border around the display, and the elongated elastic band has a width sufficiently narrow to allow placement over the border without obscuring the display;

wherein the sensor cover is placed over the camera to provide a privacy function in addition to activation prevention; and wherein the cover includes a motif.

13. The digital device activation and overuse prevention apparatus of claim 12, further comprising:

a second elongated elastic band having an elastic part to stretch around the digital device and a second sensor cover placed over an activation sensor of the digital device.

14. The digital device activation and overuse prevention apparatus of claim 12, wherein the elongated elastic band includes an elastic material.

15. The digital device activation and overuse prevention apparatus of claim 14, wherein the elastic material includes silicone, silicone rubber, polymer or an elastomer.

16. A method for operating a digital device activation and overuse prevention apparatus, comprising the steps of:

providing an elongated elastic band sized to snuggly stretch horizontally or vertically around a front, back and sides of a portion of the digital device near a camera or activation sensor on the digital device;

providing a sensor cover connected to the elongated elastic band and sized to be placed over the camera or activation sensor on the digital device, wherein the sensor cover is further sized to block the camera or activation sensor;

activating a sleep mode for the digital device;

positioning the elongated elastic band sufficiently away from the corners of the digital device to maintain a snug fit; and positioning the sensor cover over the camera or activation sensor on the digital device, thereby preventing the activation of the digital device when in the sleep mode.

17. The method of claim 16 wherein the sensor cover is placed over the camera to provide a privacy function in addition to activation prevention.

* * * * *